April 9, 1929.　　A. H. McLESKEY　　1,708,424
ATTACHMENT FOR STOVES
Filed Sept. 28, 1927
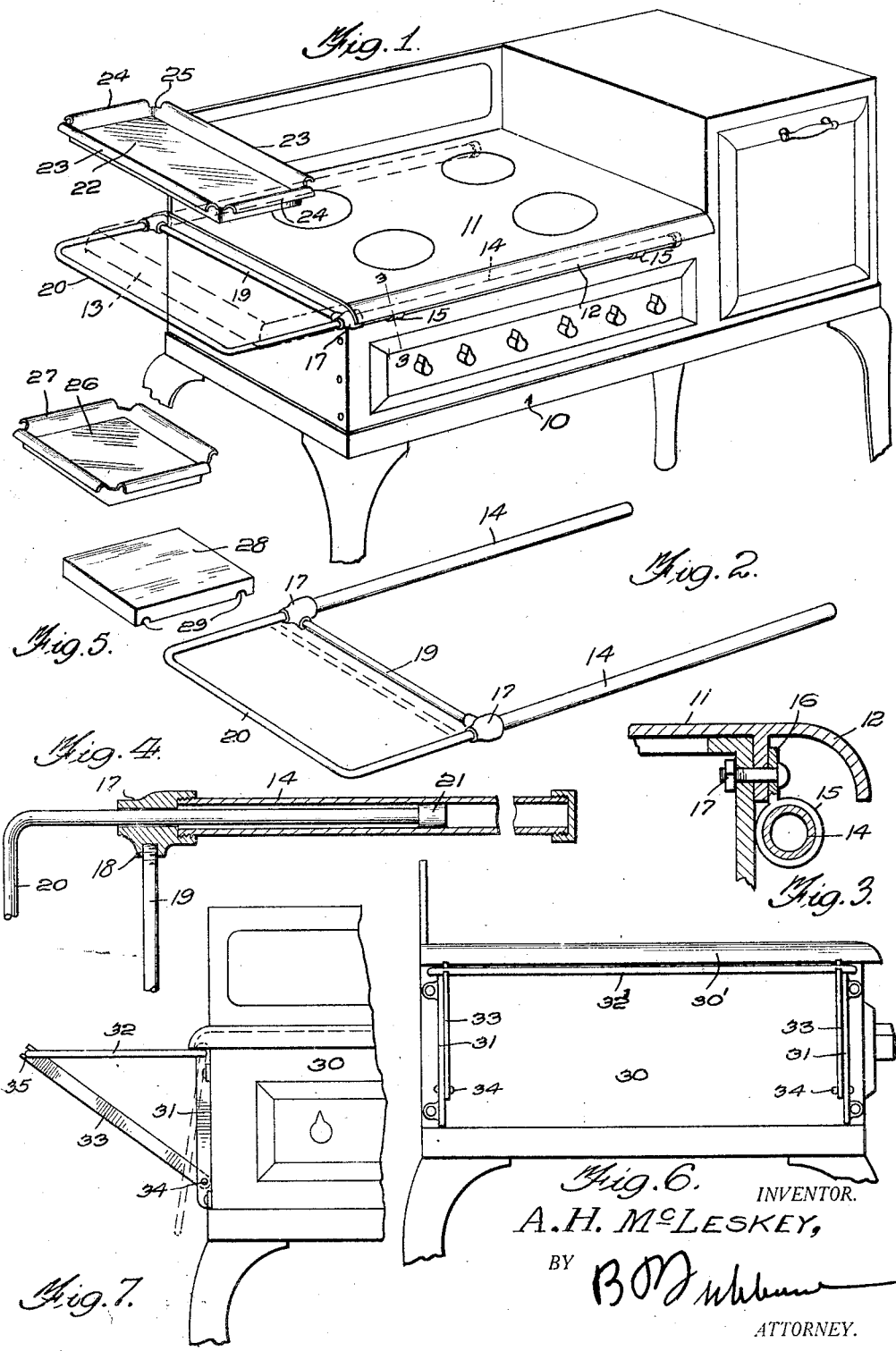
INVENTOR.
A. H. McLESKEY,
BY
ATTORNEY.

Patented Apr. 9, 1929.

1,708,424

UNITED STATES PATENT OFFICE.

ADA H. McLESKEY, OF ANDERSON, SOUTH CAROLINA.

ATTACHMENT FOR STOVES.

Application filed September 28, 1927. Serial No. 222,446.

My invention relates to an attachment for stoves and has particular reference to a rack adapted for supporting a pan and other articles.

In accordance with my invention, I provide a rack embodying preferably tubular guides which are mounted beneath the top flanges of the stove, and attached to such stove. The outer ends of these guides are connected by a rod, constituting one side of the rack. The rack embodies a U-shaped rack member, including longitudinal sides which are slidable within the tubular guides, and are adapted to be shifted to a position wholly beneath the detachable apron of the stove top. When the rack member is shifted to the open position, the apron may be removed, and a suitable tray locked upon the rectangular frame produced by the transverse rod and rack member. Instead of supporting a single tray by the rack, the same may be employed to support a small tray and a meat chopping board.

In the accompany drawings, forming a part of this specification, and in which like numerals are employed to designate like parts throughout the same, Figure 1 is a perspective view of a rack, showing the same applied to a stove, Figure 2 is a perspective view of the rack, Figure 3 is a detailed section taken on line 3—3 of Figure 1, Figure 4 is a fragmentary plan view of the rack, parts in horizontal section, Figure 5 is a perspective view of a tray and meat board to be arranged upon the rack, Figure 6 is a side elevation of a modified form of the rack embodying my invention, and, Figure 7 is an end elevation of the same.

Attention being called first to Figures 1 to 5, inclusive, the numeral 10 designates a cooking stove as a whole, which, for the purpose of illustration, is shown as an electric stove. This stove embodies the usual top 11 having down-turned side flanges 12, and a removable apron 13, at one end thereof. This is the construction of the usual stove.

My rack embodies a pair of tubular guides 14, arranged beneath the down-turned flanges 12 and held within supporting elements or rings 15, having straps 16, secured to the body of the stove by bolts 17, which are also employed to hold the parts of the stove together. The tubular guides 14 are arranged horizontally and extend longitudinally of the stove, and their outer ends are screw-threaded for receiving reducing tubular couplings 17. These couplings are provided upon their inner sides with screw-threaded openings 18 to receive the screw-threaded ends of a preferably tubular transverse rod 19. The numeral 20 designates a U-shaped rod, which is preferably tubular. The longitudinal arms of this U-shaped rod are slidable within the couplings 17 and enter the tubular guides 14. Heads 21 are rigidly attached to the inner ends of the rods 20, serving to guide the same, and to contact with the couplings 17 to limit the outward movement of the U-shaped rod 20. The rod 19 and the rod 20 are of the same diameter and are consequently arranged at the same elevation.

The numeral 22 designates a tray provided with longitudinal and transverse flanges 23 and 24, which are down-turned, as shown, and cut out at their corners, as shown at 25.

The numeral 26 designates a smaller tray having down-turned flanges 27. The numeral 28 designates a meat chopping board, having grooves 29 upon its lower side.

The operation of this form of the invention is as follows:

With the apron 13 in place upon the stove, the U-shaped rod 20 may be shifted to the inner position and the apron 13 will completely cover the same and also the couplings and rod 19. The U-shaped rod 20 may be shifted to the outer position, and the apron 13 removed from the stove, whereby the U-shaped rod and transverse rod 19 will constitute a rectangular frame. The pan 22 may now be placed within this rectangular frame and its down-turned flanges 23 and 24 will engage over the sides and ends of the frame. If desired, the tray 22 may be removed and a smaller tray 26 placed upon the frame and a meat chopping board 28 also may be arranged upon the frame at the side of the smaller pan.

In Figures 6 and 7, wherein I have shown a modification of the invention, the numeral 30 designates a stove to one side of which are attached vertical bars 31. Pivoted to the top of these vertical bars is a U-shaped frame or rack element 32. The numeral 33 designates diagonal brace legs, pivoted at their lower ends of the bars 31, as shown at 34. The upper ends of these diagonal brace legs are provided with notches 35, to receive the side of the rack element 32.

In the use of this form of the rack, by separating the diagonal brace legs 33 from the rack element 32, the brace legs and the rack element will gravitate to a vertical position beneath the down-turned flange 30' of the stove. When the rack element is in the raised position, it may serve to support various articles as is obvious.

It is to be understood that the forms of my invention, herewith shown and described, are to be taken as preferred examples of the same, and that various changes in the shape, size and arrangement of parts may be resorted to without departing from the spirit of my invention or the scope of the subjoined claims.

Having thus described my invention, I claim:—

1. The combination with a stove, of tubes attached to the sides of the stove and arranged generally horizontally, tubular couplings secured to the ends of the tubes, a transverse rod connecting the tubular couplings, a U-shaped rack element embodying a transverse part and longitudinal arms slidable within the tubular couplings and projecting into said tubes, heads carried by the longitudinal arms and arranged within said tubes and adapted to engage with the tubular couplings to limit the outward movement of the rack element, said transverse rod and said transverse part being oppositely arranged and a combined supporting and locking tray to be mounted upon the rack element and having generally vertical sockets to receive the transverse rod and transverse part.

2. The combination with a stove provided upon its sides with covering flanges and at one end with a removable apron, of tubular guide elements attached to the stove beneath the covering flanges, a transverse rod connecting the outer ends of the tubular guide elements and arranged beneath the removable apron, a U-shaped rack element embodying a transverse part and longitudinal arms, said transverse rod and transverse part being oppositely arranged, said arms being slidable within the tubular guides, the U-shaped rack element being adapted to be shifted to an inner position beneath the apron, and a combined supporting and locking tray adapted to be mounted upon the rack element and having generally vertical sockets to receive the transverse rod and transverse part.

In testimony whereof I affix my signature.

Mrs. ADA H. McLESKEY.